United States Patent [19]
Rehfuss

[11] Patent Number: 5,300,328
[45] Date of Patent: Apr. 5, 1994

[54] PARTIALLY-DEFUNCTIONALIZED AMINOPLAST CURING FOR POLYMER COMPOSITIONS

[75] Inventor: John W. Rehfuss, West Bloomfield, Mich.

[73] Assignee: BASF Corporation, Southfield, Mich.

[21] Appl. No.: 965,510

[22] Filed: Oct. 23, 1992

[51] Int. Cl.$^5$ .............................................. B05D 7/14
[52] U.S. Cl. .................. 427/388.3; 427/407.1; 427/409; 427/412.1; 525/509; 525/518; 525/157; 528/262; 528/254
[58] Field of Search ............... 427/388.3, 407.1, 412.1, 427/409; 525/509, 518, 157; 528/262, 254

[56] References Cited

U.S. PATENT DOCUMENTS

| | | | |
|---|---|---|---|
| 2,928,812 | 3/1960 | Ernst | 528/262 |
| 3,661,819 | 5/1972 | Koral et al. | 204/181.6 |
| 4,262,033 | 4/1981 | Massy et al. | 427/388.3 |
| 4,361,594 | 11/1982 | Winterbottom | 525/509 |
| 4,404,248 | 9/1983 | Spinelli et al. | 427/388.3 |
| 4,520,167 | 5/1985 | Blank et al. | 525/131 |
| 4,708,984 | 11/1987 | Forgione et al. | 525/127 |
| 4,710,542 | 12/1987 | Forgione et al. | 525/127 |
| 5,006,653 | 4/1991 | Forgione et al. | 544/196 |
| 5,089,561 | 2/1992 | Forgione et al. | 525/127 |
| 5,089,617 | 2/1992 | Forgione et al. | 544/196 |
| 5,175,201 | 12/1992 | Forgione et al. | 525/454 |

OTHER PUBLICATIONS

Kirk-Othmer Encyclopedia of Chemical Technology, vol. 2, pp. 440–469. "Amino Resins & Plastics", 1978.
Singh et al., Carbamylmethylated Melamines Novel Crosslinkers for the Coatings Industry, pp. 193–207 Advanced Organic Coating Science and Technology Series, 1991.

*Primary Examiner*—Michael Lusignan
*Assistant Examiner*—Erma Cameron
*Attorney, Agent, or Firm*—Paul L. Marshall

[57] ABSTRACT

A method of producing a cured coating is described comprising the steps of:
(A) applying a coating composition on a substrate, wherein the coating composition is a curable coating composition comprising:
  (1) a polymer comprising functional groups that are reactive with methylol and/or methylalkoxy substituents on the amino nitrogens of an aminoplast curing agent, and
  (2) an aminoplast curing agent that includes, as substituents on the amino nitrogens:
    (a) a plurality of methylol and/or methylalkoxy substituents, and
    (b) one or more substituents that are either non-reactive with the functional groups on the polymer or are reactive with the functional groups at a higher temperature than the temperature at which the methylol and/or methylalkoxy substituents are reactive with the functional groups, and
(B) curing the coating at a cure temperature sufficient to react the functional groups on the polymer with the methylol and/or methylalkoxy substituents, but below the temperature for reaction, if any, between the functional groups and the (b) substituents.

16 Claims, No Drawings

PARTIALLY-DEFUNCTIONALIZED AMINOPLAST CURING FOR POLYMER COMPOSITIONS

FIELD OF THE INVENTION

This invention relates to curable compositions, and in particular to compositions utilizing an aminoplast curing agent.

BACKGROUND OF THE INVENTION

Aminoplast resins are widely utilized as curing agents for polymer compositions. Aminoplast resins are typically prepared by reacting certain polyamines such as melamine or urea with an aldehyde such as formaldehyde to form alkylol group substituents on the amino nitrogens. The alkylol groups may be alkylated by reaction with an alcohol to form alkylalkoxy groups. The alkylalkoxy or alkylol groups are reactive with a variety of functional groups that can be appended to polymer backbones. Such functional groups include hydroxyl, acid (e.g., carboxyl), carbamate, amide, and ureido groups.

Curable polymer compositions such as those cured with aminoplast resins are usually made to achieve a desired specification with regard to the physical properties of the cured polymer. Often, it is desired to achieve a cured polymer that exhibits a high level of hardness without being brittle. This can be a particularly desirable objective in curable coating compositions, where hardness provides durability to the coating and flexibility provides smooth, contiguous coatings that do not crack or peel when subjected to stress, temperature variations, and the like.

One way to achieve a desired level of hardness is to control the crosslink density of the cured polymer composition. This can be accomplished by varying the level or amount of functional crosslinkable groups on the polymer or by varying the relative amounts of polymer and aminoplast in the curable composition. The control of the crosslink density is still somewhat limited, however, and often a tradeoff must be made between hardness and flexibility. The result of this is that desired levels of hardness and brittleness cannot be concurrently achieved. In certain applications, such as with the clearcoat layer of a color-plus-clear composite coating, this tradeoff manifests itself with the observation that when a coating has sufficient hardness to exhibit the desired durability, an undesirable level of brittleness causes a variety of problems such as environmental etch. Environmental etch manifests itself as spots or marks on or in the clear finish of the coating that often cannot be rubbed out. It is often difficult to predict the degree of resistance to environmental etch that a clearcoat will exhibit. Many coating compositions known for their durability and/or weatherability when used in exterior paints, such as high-solids enamels, do not provide the desired level of resistance to environmental etch when used as the clearcoat of a color-plus-clear composite coating. Thus, it would be desirable to provide further control over the crosslink density of aminoplast-cured polymer compositions.

SUMMARY OF THE INVENTION

The present invention provides a method of producing a cured coating comprising the steps of:

(A) applying a coating composition on a substrate, wherein the coating composition is a curable coating composition comprising:
  (1) a polymer comprising functional groups that are reactive with methylol and/or methylalkoxy substituents on the amino nitrogens of an aminoplast curing agent, and
  (2) an aminoplast curing agent that includes, as substituents on the amino nitrogens:
    (a) a plurality of methylol and/or methylalkoxy substituents, and
    (b) one or more substituents that are either non-reactive with the functional groups on the polymer or are reactive with the functional groups at a higher temperature than the temperature at which the methylol and/or methylalkoxy substituents are reactive with the functional groups, and
(B) curing the coating at a cure temperature sufficient to react the functional groups on the polymer with the methylol and/or methylalkoxy substituents, but below the temperature for reaction, if any, between the functional groups and the (b) substituents.

The method of the present invention provides additional control of the crosslink density of aminoplast-cured polymer compositions. This can allow for improved optimization of hardness and brittleness properties of such compositions. In the coating art, this can be especially useful, particularly for providing durable etch-resistant clearcoats for color-plus-clear composite coatings.

DESCRIPTION OF THE PREFERRED EMBODIMENTS

The polymer comprising functional groups reactive with the aminoplast curing agent may be any of a number of known polymers, such as an alkyl, polyester, epoxy polymer (e.g., condensation polymer of polyglycidyl ether and bisphenol), acrylic polymer (e.g., polymer of acrylic acid, methacrylic acid, butyl acrylate, hydroxypropyl methacrylate, etc.), vinyl polymer (e.g., polymer of styrene), or a polyurethane. The choice of polymer will depend on the particular desired characteristics. In one preferred embodiment where the curable composition is used as a coating composition, particularly a surface coating composition, the polymer is an acrylic polymer, an acrylic/vinyl copolymer, a polyurethane, an epoxy polymer, or a polyester, and more preferably an acrylic or acrylic vinyl copolymer.

The functional group(s) that can be utilized on the polymer can be any group that is reactive with the methylol and/of methylolalkoxy group of an aminoplast curing agent. Generally, such functional groups include an active hydrogen. Examples of useful functional groups include carbamate, hydroxyl, carboxyl, amide, and ureido. Preferably, the functional group is carbamate or hydroxyl, and more preferably, the functional group is carbamate. Techniques for incorporation of such functional groups into polymer materials are well-known in the art. For example, carbamate-functional polymers are described in U.S. Pat. Nos. 3,479,328, 3,674,838, 4,126,747, 4,279,833, 4,340,497, and concurrently-filed U.S. patent application 07/965,509 entitled "Curable Carbamate Polymer Composition" in the names of John W. Rehfuss and Donald L. St. Aubin, the disclosures of which are incorporated herein by reference. Hydroxyl-functional acrylic polymers are typically formed by the copolymerization of hydroxyalkyl esters of acrylic or methacrylic acid with other acrylic or vinyl monomers. Acid-functional acrylics are easily prepared by the copolymerization of acrylic acid or methacrylic acid with other acrylic or vinyl monomers. Hydroxyl-functional polyurethanes are typically prepared by the reaction of polyisocyanates with excess quantities of polyols having two or more hydroxyl groups per molecule. Acid or hydroxyfunctional polyesters are formed by the reaction of polyacids with polyols, the acid or hydroxyl functionality being determined by the respective amounts of acid or hydroxyl functionality present in the starting materials. The above description is representative in nature, and it is understood that other polymers known in the art to have functional groups that are reactive with aminoplast curing agents can be used in the practice of the present invention.

Aminoplast curing agents used according to the invention are well-known in the art. The most common aminoplast resins are aldehyde condensation products of aminoplast precursors such as melamine, urea, benzoguanamine, or other similar compounds, although aldehyde condensates of other aminoplast precursors, such as triazines, diazines, triazoles, guanidines, guanamines, and alkyl or aryl-substituted derivatives of such compounds. Examples of useful aminoplast precursors include melamine, N,N'-dimethylurea, benzoguanamine, benzourea, dicyandiamide, 6-methyl-2,4-diamino-1,3,5-triazine, triaminopyrimidine, and the like. These aminoplast precursors are typically reacted in a condensation with formaldehyde, although the benefits of the invention could also be achieved using other aldehydes such as acetaldehyde, benzaldehyde, and the like.

The above-described aminoplast compounds may be alkylated by reaction with an alcohol, such as methanol, ethanol, propanol, butanol, benzyl alcohol, and the like, with methanol and butanol being preferred.

According to the invention, one or more of the substituents on the amino nitrogens of the aminoplast curing agent are either non-reactive with the functional groups on the polymer or are reactive with the functional groups at a higher temperature than the temperature at which the methylol and/or methylalkoxy substituents are reactive with the functional groups. Such non-reactive or higher temperature reactive groups can include carbamate groups and amide groups, with carbamate groups being preferred. These groups can be adducted to the aminoplast by reacting it with a compound that, when reacted with methylol or methylolalkoxy, will provide a group that is either non-reactive with the polymer functional groups or reacts at a higher temperature than that at which the methylol or methylalkoxy groups react with the polymer functional groups. Examples of such compounds include alkyl carbamates, alkyl amides.

Carbamate-modified aminoplast curing agents represent a preferred class of compounds useful in the practice of the invention. Such curing agents are described in U.S. Pat. Nos. 4,708,984 and 4,710,542, the disclosures of which are incorporated herein by reference. These compounds are formed by reacting alkyl carbamates with aminoplast compounds. This reaction is typically carried out by heating in the melt or in solution, e.g., in benzene, toluene, xylene, and the like. A catalyst, such as p-toluene sulfonic acid, nitric acid, or sulfuric acid should be used. The reaction temperature should be 80°-150° C., and preferably 90°-120° C. The degree of substitution of the aminoplast's methylol or methlylalkoxy groups can be controlled by adjusting the stoichiometric amount of alkyl carbamate to the desired degree of substitution.

The carbamate-modified aminoplast curing agents can be represented by either of the formulas:

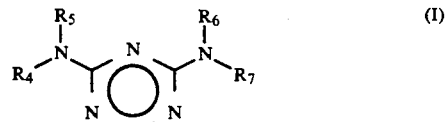 (I)

or

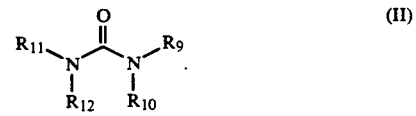 (II)

In these formulas, $R_1$ is phenyl or

and $R_2$-$R_7$ and $R_9$-$R_{12}$ are each independently —CH$_2$OR$_8$ or —CH$_2$—NR'—CO$_2$R", wherein $R_8$ is H, alkyl, or aryl, R' is H or alkyl, and R" is alkyl, with the proviso that at least two of $R_2$, $R_3$, $R_4$, $R_5$, $R_6$, and $R_7$ are —CH$_2$OR$_8$ and at least one of $R_2$, $R_3$, $R_4$, $R_5$, $R_6$, and $R_7$ are —CH$_2$—NR'—CO$_2$R". It should be understood that in the context of the present invention, alkyl can include substituted alkyl and aryl can include substituted aryl where the substituents would not have an adverse impact on the performance of the invention. The above alkyl groups are preferably of 1-8 carbon atoms, and the above aryl group is preferably of 6-12 carbon atoms. Examples of useful alkyl groups for the above R groups include methyl, ethyl, n-propyl, n-butyl, i-butyl, 3-chloropropyl, and benzyl. Examples of useful aryl groups for R8 include phenyl, naphthyl, 2-chlorophenyl, 4-chlorophenyl, 2-tolyl, and 4-tolyl.

In one preferred embodiment, the compound is an aminoplast according to formula (I) where $R_1$ is

three of $R_2$, $R_3$, $R_4$, $R_5$, $R_6$, and $R_7$ are —CH$_2$OR$_8$ and three of $R_2$, $R_3$, $R_4$, $R_5$, $R_6$, and $R_7$ are —CH$_2$—NR'—CO$_2$R".

The curable composition of the invention may be utilized in a variety of applications, such as castings, moldings, and coatings. A solvent may optionally be utilized in the composition of the present invention. Although the composition of the present invention may be utilized, for example, in the form of substantially solid powder, or a dispersion, it is often desirable that the composition is in a substantially liquid state, which can be accomplished with the use of a solvent. This solvent should act as a solvent with respect to both the components (A)(1) and (A)(2). In general, depending on the solubility characteristics of components (A)(1) and (A)(2), the solvent can be any organic solvent and/or water. In one preferred embodiment, the solvent is a polar organic solvent. More preferably, the solvent is a polar aliphatic solvents or polar aromatic solvents. Still more preferably, the solvent is a ketone, ester, acetate, aprotic amide, aprotic sulfoxide, or aprotic amine. Examples of useful solvents include methyl ethyl ketone, methyl isobutyl ketone, m-amyl acetate, ethylene glycol butyl ether-acetate, propylene glycol monomethyl ether acetate, xylene, n-methylpyrrolidone, or blends of aromatic hydrocarbons. In another preferred embodiment, the solvent is water or a mixture of water with small amounts of aqueous co-solvents.

The composition of the invention may include a catalyst to enhance the cure reaction. For example, when aminoplast compounds, especially monomeric melamines, are used as component (A)(2), a strong acid catalyst may be utilized to enhance the cure reaction. Such catalysts are well-known in the art and include, for example, p-toluenesulfonic acid, dinonylnaphthalene disulfonic acid, dodecylbenzenesulfonic acid, phenyl acid phosphate, monobutyl maleate, butyl phosphate, and hydroxy phosphate ester.

In a preferred embodiment of the invention, the composition of the invention is utilized as a coating composition. In such a composition, the solvent may be present in the composition of the invention in an amount of from about 0.01 weight percent to about 99 weight percent, preferably from about 10 weight percent to about 60 weight percent, and more preferably from about 30 weight percent to about 50 weight percent.

Coating compositions can be coated on the article by any of a number of techniques well-known in the art. These include, for example, spray coating, dip coating, roll coating, curtain coating, and the like. For automotive body panels, spray coating is preferred.

In a particularly preferred embodiment, the composition of the invention is used as a clear and/or colorless coating composition over a pigmented basecoat as part of a composite color-plus-clear coating. Such composite coatings are popular for their depth of color and liquid glossy surface appearance. They have found particularly wide acceptance in the field of automotive coatings. The composition of the invention may also be used as the basecoat of a composite color-plus-clear coating.

Other pigmented basecoat compositions for such composite coatings are well-known in the art, and do not require explanation in detail herein. Polymers known in the art to be useful in basecoat compositions include acrylics, vinyls, polyurethanes, polycarbonates, polyesters, alkyls, and polysiloxanes. Preferred polymers include acrylics and polyurethanes. Basecoat polymers are preferably crosslinkable, and thus comprise one or more type of cross-linkable functional groups. Such groups include, for example, hydroxy, isocyanate, amine, epoxy, acrylate, vinyl, silane, and acetoacetate groups. These groups may be masked or blocked in such a way so that they are unblocked and available for the cross-linking reaction under the desired curing conditions, generally elevated temperatures. Useful cross-linkable functional groups include hydroxy, epoxy, acid, anhydride, silane, and acetoacetate groups. Preferred cross-linkable functional groups include hydroxy functional groups and amino functional groups.

Basecoat polymers may be self-cross-linkable, or may require a separate cross-linking agent that is reactive with the functional groups of the polymer. When the polymer comprises hydroxy functional groups, for example, the cross-linking agent may be an aminoplast resin, isocyanate and blocked isocyanates (including isocyanurates), and acid or anhydride functional cross-linking agents.

After an article is molded, casted, or coated with the above-described layers, the composition is subjected to conditions so as to cure the coating layers. Although various methods of curing may be used, heat-curing is preferred. Generally, heat curing is effected by exposing the coated article to elevated temperatures provided primarily by radiative heat sources. Curing temperatures will vary depending on the aminoplast and functional polymer used, however they generally range between 93° C. and 177° C., and are preferably between 121° C. and 141° C. The curing time will vary depending on the particular components used, and physical parameters such as the thickness of the layers, however, typical curing times range from 15 to 60 minutes.

The invention is further described in the following examples.

Preparation 1—Acrylic

A three-necked 5-1 round bottom flask was fitted with an agitator at the center neck and a thermal couple at one of the side necks to monitor the reaction temperature. A nitrogen purge line was also fed through this neck. The second side neck was fitted with a Claissen adaptor and water cooled condenser.

198 g Urethane-grade mixed aromatics solvent (Solvesso®100) and 225 g urethane-grade toluene were charged to the flask. The mixture was agitated and heated to reflux with a nitrogen purge. As the mixture reached reflux temperature, 127° C., the nitrogen purge was discontinued.

923 g TMI® (unsaturated m-tetramethyl xylene isocyanate, American Cyanamid), 692 g ethyl hexyl acrylate and 269 g of a 50% solution of t-butyl peracetate in odorless mineral spirits were charged to a separate container. This mixture was pumped to the refluxing solvents over a period of 3.5 hour. At the conclusion of this first feed, a second addition of 27 g of the t-butyl peracetate solution and 27 g urethane grade mixed aromatics were charged over 30 minutes. 8.2 g Urethane-grade mixed aromatics was flushed through the pump and into the reaction mixture after the second initiator feed. The reaction mixture was then held at reflux, 135° C. for one hour.

After this hold period, the batch was cooled to 70° C. 1.1 g Dibutyltin dilaurate was charged and mixed into the batch for five minutes. At this point, 565 g hydroxypropyl carbamate was charged to the reaction mixture over 30 minutes. The batch was then slowly heated to 100° C. and held at this temperature until isocyanate functionality had disappeared as determined by infrared spectroscopy or titration. Upon the disappearance of the isocyanate, 852 g monobutyl ether of ethylene glycol was charged to the vessel and allowed to homogenize. The heat to the reaction was turned off and the carbamate functional acrylic was removed from the vessel.

Preparation 2 —Carbamate-modified melamine

A three-necked 5-1 round-bottomed flask was fitted with a vacuum sealed agitator at the center neck and a thermocouple at a side neck to monitor the reaction temperature. The second side neck as temporarily fitted with a water cooled condensor. Vacuum was applied through a collecting vessel and supercooled condensor via this side neck of the reaction flask.

1708 g Hexamethoxylated monomeric melamine and 1044 g butyl carbamate were charged to the flask. The mixture was homogenized with agitation while heating slowly to 60° C. As the mixture reached 60° C., 1.2 g dodecylbenzyl sulfonic acid was charged to the vessel. The condensor was removed and the flask fitted to the vacuum set-up. The mixture was heated to 100° C. at a rate of 1° C./min. When the mixture reached 70° C., 15≈20" vacuum was applied. The methanol was collected as it condensed in the supercooled condensor. A stoichiometric amount of methanol, 279 g, was removed in 2.5 hours at 25" vacuum and 100° C. After this amount was removed, the heat and vacuum were discontinued. The vessel was charge with 433 g xylene, homogenized, and carbamate-modified melamine separated from the mixture.

EXAMPLE 1

A clear coating composition was prepared by combining the following materials:

665 g carbamated acrylic (Preparation 1)
167 g carbamated melamine (Preparation 2)
345 g butyl acetate
44 g Exate ® 800 (methyl octoate isomers)
19 g Inuvin ® 384B (hindered amine light stabilizer)
6 g Tanuvin ® 123 (ultraviolet absorber)
12 g 25%active oxizolidine blocked dodecylbenzyl sulfonic acid The coating composition was sprayed over steel panels that had been previously sprayed with an acrylic pigmented basecoat and flashed. Viscosity was adjusted to seconds with butyl acetate. The panels were baked 10 minutes at 82° C. and 20 minutes at 132° C.

Film builds: basecoat 15 μm, clearcoat 51 μm.
Tukon hardness 13.5.
MEK rubs 200, slight scoring.

The invention has been described in detail with reference to preferred embodiments thereof. It should be understood, however, that variations and modifications can be made within the spirit and scope of the invention.

What is claimed is:

1. A method of producing a cured coating comprising the steps of:
   (A) applying a coating composition on a substrate, wherein the coating composition is a curable coating composition comprising:
      (1) a polymer comprising functional groups that are reactive with methylol and/or methylalkoxy substituents on the amino nitrogens of an aminoplast curing agent,
      (2) an aminoplast curing agent that includes, as substituents on the amino nitrogens:
         (a) a plurality of methylol and/or methylalkoxy substituents, and
         (b) one or more substituents that are either non-reactive with the functional groups on the polymer or are reactive with the functional groups at a higher temperature than the temperature at which the methylol and/or methylalkoxy substituents are reactive with the functional groups, and
   (B) curing the coating at a cure temperature sufficient to react the functional groups on the polymer with said methylol and/or methylalkoxy substituents, but below the temperature for reaction, if any, between the functional groups and said (b) substituents.

2. A method according to claim 1 wherein said (b) substituents comprise carbamate groups.

3. A method according to claim 2 wherein said cure temperature is from 100° C. to 150° C.

4. A method according to claim 2 wherein said cure temperature is from 110° C. to 140° C.

5. A method according to claim 2 wherein said cure temperature is from 120° C. to 135° C.

6. A method according to claims 1 or 2 wherein the functional group on the polymer (A)(1) is selected from the group consisting of hydroxyl, acid, carbamate, amide, and ureido.

7. A method according to claims 1 or 2 wherein the functional group on the polymer (A)(1) is hydroxyl or carbamate.

8. A method according to claims 1 or 2 wherein the functional group on the polymer (A)(1) is carbamate.

9. A method according to claims 1 or 2 wherein the aminoplast is a melamine or urea aminoplast.

10. A method according to claim 9 wherein the aminoplast is a melamine aminoplast, and 3 of the substituents on the amino nitrogens of the melamine are (b) substituents.

11. A method according to claim 1 wherein the (b) substituents are each independently according to the formula $-CH_2-NR'-CO_2R''$, wherein $R'$ is H or alkyl and $R''$ is alkyl.

12. A method according to claims 1 or 2 wherein said aminoplast curing agent has the formula:

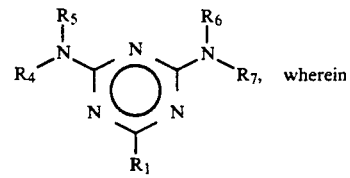

$R_1$ is phenyl or

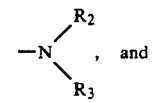

$R_2$, $R_3$, $R_4$, $R_5$, $R_6$, and $R_7$ are each independently $-CH_2OR_8$ or $-CH_2-NR'-CO_2R''$, wherein $R_8$ is H, alkyl, or aryl, $R'$ is H or alkyl, and $R''$ is alkyl, with the proviso that at least two of $R_2$, $R_3$, $R_4$, $R_5$, $R_6$, and $R_7$ are $-CH_2OR_8$ and at least one of $R_2$, $R_3$, $R_4$, $R_5$, $R_6$, and $R_7$ are $-CH_2-NR'-CO_2R''$.

13. A method according to claim 12 wherein $R_1$

three of $R_2$, $R_3$, $R_4$, $R_5$, $R_6$, and $R_7$ are $-CH_2OR_8$ and three of $R_2$, $R_3$, $R_4$, $R_5$, $R_6$, and $R_7$ are $-CH_2-NR'-CO_2R''$.

14. A method according to claims 1 or 2 wherein said aminoplast curing agent has the formula:

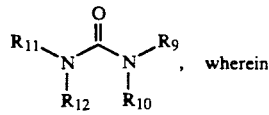, wherein $R_9$, $R_{10}$, $R_{11}$, and $R_{12}$ are each independently —$CH_2OR_8$ or —$CH_2$—$NR'$—$CO_2R''$, wherein $R_1$ is H or alkyl, $R_8$ is H, alkyl, or aryl, and $R''$ is alkyl, with the proviso that at least two of $R_9$, $R_{10}$, $R_{11}$, and $R_{12}$ are —$CH_2OR_8$ and at least one of $R_9$, $R_{10}$, $R_{11}$, and $R_{12}$ are —$CH_2$—$NR'$—$CO_2R''$.

15. A method according to claims 1 or 2 wherein said coating composition is a clear coating composition.

16. A method according to claim 14 wherein said substrate is an article having a layer of a pigmented basecoat composition thereon.

* * * * *